(12) United States Patent
Bian et al.

(10) Patent No.: US 7,862,913 B2
(45) Date of Patent: Jan. 4, 2011

(54) OXIDE MAGNETIC RECORDING LAYERS FOR PERPENDICULAR RECORDING MEDIA

(75) Inventors: Xiaoping Bian, Saratoga, CA (US); Qing Dai, San Jose, CA (US); Hoa Do, Fremont, CA (US); Yoshihiro Ikeda, San Jose, CA (US); David Margulies, Salinas, CA (US); Mary Frances Minardi, Santa Cruz, CA (US); Natacha Frederique Supper, Campbell, CA (US); Kentaro Takano, San Jose, CA (US); Min Xiao, Los Gatos, CA (US); Qi-Fan Xiao, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 645 days.

(21) Appl. No.: 11/584,992

(22) Filed: Oct. 23, 2006

(65) Prior Publication Data

US 2008/0096053 A1    Apr. 24, 2008

(51) Int. Cl.
*G11B 5/66* (2006.01)
*G11B 5/706* (2006.01)

(52) U.S. Cl. .............. 428/829; 428/836.2; 428/836.3

(58) Field of Classification Search ............. None
See application file for complete search history.

(56) References Cited

U.S. PATENT DOCUMENTS

| | | | |
|---|---|---|---|
| 5,516,547 A * | 5/1996 | Shimizu et al. | 427/132 |
| 5,679,473 A | 10/1997 | Murayama et al. | |
| 5,969,910 A * | 10/1999 | Imagawa et al. | 360/319 |
| 6,413,608 B1 * | 7/2002 | Bian et al. | 428/831.2 |
| 6,602,621 B2 | 8/2003 | Matsunuma et al. | |
| 6,641,901 B2 | 11/2003 | Yoshida et al. | |
| 6,652,998 B2 | 11/2003 | Segawa et al. | |
| 6,686,070 B1 * | 2/2004 | Futamoto et al. | 428/827 |
| 6,699,600 B2 | 3/2004 | Shimizu et al. | |
| 6,723,458 B2 | 4/2004 | Shimizu et al. | |
| 6,767,651 B2 | 7/2004 | Uwazumi et al. | |
| 6,777,066 B1 | 8/2004 | Chang et al. | |
| 6,835,475 B2 * | 12/2004 | Carey et al. | 428/828.1 |

(Continued)

FOREIGN PATENT DOCUMENTS

EP    0140513 A1    5/1985

(Continued)

OTHER PUBLICATIONS

Byeon et al., Synthetic Antiferromagnetic Soft Underlyaers for Perpendicular Recording Media, Jul. 2004, IEEE Transactions on Magnetics, vol. 40, No. 4, p. 2386.*

(Continued)

*Primary Examiner*—Jennifer C McNeil
*Assistant Examiner*—Adam C Krupicka
(74) *Attorney, Agent, or Firm*—Darren Gold

(57) ABSTRACT

An improved structure for the construction of perpendicular recording media is disclosed. The structure includes a perpendicular recording layer with at least two oxide sublayers or a lower sublayer of a non-oxide. One structure includes an upper sublayer comprised of a Silicon-oxide, while a lower sublayer is comprised of a Tantalum-oxide. The structures provide for increased coercivity and corrosion resistance.

12 Claims, 6 Drawing Sheets

U.S. PATENT DOCUMENTS

| | | | |
|---|---|---|---|
| 6,881,503 | B2 | 4/2005 | Lu et al. |
| 6,916,557 | B2 | 7/2005 | Hirayama et al. |
| 2002/0028356 | A1* | 3/2002 | Kawato et al. ......... 428/694 TM |
| 2002/0028357 | A1* | 3/2002 | Shukh et al. .......... 428/694 TM |
| 2002/0058160 | A1 | 5/2002 | Oikawa et al. |
| 2002/0127433 | A1 | 9/2002 | Shimizu et al. |
| 2002/0136929 | A1 | 9/2002 | Oikawa et al. |
| 2003/0099869 | A1 | 5/2003 | Oikawa et al. |
| 2003/0104253 | A1* | 6/2003 | Osawa et al. .......... 428/694 TM |
| 2003/0170500 | A1 | 9/2003 | Shimizu et al. |
| 2004/0000374 | A1 | 1/2004 | Watanabe et al. |
| 2004/0013909 | A1 | 1/2004 | Shimizu et al. |
| 2004/0023073 | A1 | 2/2004 | Shimizu et al. |
| 2004/0038083 | A1 | 2/2004 | Hirayama et al. |
| 2004/0057156 | A1 | 3/2004 | Lee et al. |
| 2004/0185308 | A1 | 9/2004 | Koda et al. |
| 2004/0224185 | A1 | 11/2004 | Nakamura et al. |
| 2005/0142387 | A1 | 6/2005 | Araki et al. |
| 2005/0153169 | A1 | 7/2005 | Watanabe et al. |
| 2006/0121319 | A1* | 6/2006 | Wu et al. ................ 428/836.2 |
| 2008/0138662 | A1* | 6/2008 | Berger et al. ................ 428/848 |

FOREIGN PATENT DOCUMENTS

| | | |
|---|---|---|
| JP | 57-30118 | 2/1982 |
| JP | 60-64413 | 4/1985 |
| JP | 61-26927 | 2/1986 |
| JP | 62-132217 | 6/1987 |
| JP | 62-132224 | 6/1987 |
| JP | 62-162222 | 7/1987 |
| JP | 63-98827 | 4/1988 |
| JP | 63-201912 | 8/1988 |
| JP | 63-281219 | 11/1988 |
| JP | 1-287820 | 11/1989 |
| JP | 3-160616 | 7/1991 |
| JP | 6-103555 | 4/1994 |
| JP | 8-63734 | 3/1996 |
| JP | 2000-348327 | 12/2000 |
| JP | 2002-25030 | 1/2002 |
| JP | 2002-183927 | 6/2002 |
| JP | 2003-168207 | 6/2003 |
| JP | 2004-22138 | 1/2004 |
| JP | 2004-259423 | 9/2004 |
| JP | 2005-93040 | 4/2005 |
| JP | 2005-166204 | 6/2005 |
| WO | WO2004/090874 A1 | 10/2004 |
| WO | WO 2004090874 A1 * | 10/2004 |

OTHER PUBLICATIONS

Mukai et al., "Microstructure Improvement of Thin Ru Underlayer for CoCrPt-SiO2 Granular . . . ," IEEE Trans. MAG 41, No. 10, pp. 3169-3171, Oct. 2005.

Mukai et al., "Signal-to-media-noise ratio improvement of CoCrPt-SiO2 granular perpendicular media . . . ," J. of Appl. Phys. 97, 10N119 1-3 (2005).

Uwazumi et al., "CoPtCr-SiO2 Granular Media for High-Density Perpendicular Recording," IEEE Trans. MAG. 39, No. 4, Jul. 2003, pp. 1914-1918.

Chiba et al., "Structure and Magnetic Properties of Co-Pt-Ta2O5 Film for Perpendicular Magnetic Recording Media," J. of MMM 287 (2005) pp. 167-171.

* cited by examiner

OXIDE MAGNETIC RECORDING LAYERS FOR PERPENDICULAR RECORDING MEDIA

FIELD OF THE INVENTION

This invention relates generally to perpendicular magnetic recording media, and more particularly to a disk with a perpendicular magnetic recording layer for use in magnetic recording hard disk drives.

BACKGROUND OF THE INVENTION

Magnetic media are widely used in various applications, particularly in the computer and data storage industries, in devices such as hard disk drives and other recording devices. Efforts are continually being made with the aim of increasing the areal recording density, i.e., bit density of the magnetic media. In order to produce storage densities in excess of 200 Gb/in$^2$, new recording media structures will be required. In this regard, perpendicular recording media structures (PMR) have been found to be superior to the more conventional longitudinal media in achieving very high bit densities. In perpendicular magnetic recording media, remanent magnetization is formed in a direction perpendicular to the surface of the magnetic medium.

Perpendicular magnetic recording, wherein the recorded bits are stored in a perpendicular or out-of-plane orientation in the recording layer, is a promising path toward ultra-high recording densities in magnetic recording hard disk drives. A common type of perpendicular magnetic recording system is one that uses a "dual-layer" media. This type of system is shown in FIG. 1 with a single write pole type of recording head. The dual-layer media includes a perpendicular magnetic data recording layer (RL) formed on a "soft" or relatively low-coercivity magnetically permeable underlayer (SUL). The SUL serves as a flux return path for the field from the write pole to the return pole of the recording head. In FIG. 1, the RL is illustrated with perpendicularly recorded or magnetized regions, with adjacent regions having opposite magnetization directions, as represented by the arrows. The magnetic transitions between adjacent oppositely-directed magnetized regions are detectable by the read element or head as the recorded bits.

FIG. 2 is a schematic of a cross-section of a prior art perpendicular magnetic recording disk showing the write field $H_w$ acting on the recording layer RL. The disk also includes the hard disk substrate, a seed or onset layer (OL) for growth of the SUL, an intermediate layer (IL) between the SUL and the RL, and a protective overcoat (OC). The IL is a nonmagnetic layer or multilayer structure, also called an "exchange break layer" or EBL, that breaks the magnetic exchange coupling between the magnetically permeable films of the SUL and the RL and facilitates epitaxial growth of the RL. While not shown in FIG. 2, a seed layer is typically deposited directly on the SUL to facilitate the growth of the IL. As shown in FIG. 2, the RL is located inside the gap of the "apparent" recording head (ARH), which allows for significantly higher write fields compared to longitudinal or in-plane recording. The ARH comprises the write pole (FIG. 1) which is the real write head (RWH) above the disk, and an effective secondary write pole (SWP) beneath the RL. The SWP is facilitated by the SUL, which is decoupled from the RL by the IL and by virtue of its high permeability produces a magnetic mirror image of the RWH during the write process. This effectively brings the RL into the gap of the ARH and allows for a large write field $H_w$ inside the RL.

One type of material for the RL is a granular ferromagnetic cobalt alloy, such as a CoPtCr alloy, with a hexagonal-close-packed (hcp) crystalline structure having the c-axis oriented substantially out-of-plane or perpendicular to the RL. The granular cobalt alloy RL should also have a well-isolated fine-grain structure to produce a high-coercivity ($H_c$) media and to reduce intergranular exchange coupling, which is responsible for high intrinsic media noise. Enhancement of grain segregation in the cobalt alloy RL is achieved by the addition of oxides, including oxides of Si, Ta, Ti, and Nb. These oxides tend to precipitate to the grain boundaries, and together with the elements of the cobalt alloy form nonmagnetic intergranular material. A perpendicular magnetic recording medium with a RL of a CoPtCr granular alloy with added $SiO_2$ is described by H. Uwazumi, et al., "CoPtCr—$SiO_2$ Granular Media for High-Density Perpendicular Recording", IEEE Transactions on Magnetics, Vol. 39, No. 4, July 2003, pp. 1914-1918. A perpendicular magnetic recording medium with a RL of a CoPt granular alloy with added $Ta_2O_5$ is described by T. Chiba et al., "Structure and magnetic properties of Co—Pt—$Ta_2O_5$ film for perpendicular magnetic recording media", Journal of Magnetism and Magnetic Materials, Vol. 287, February 2005, pp. 167-171.

The cobalt alloy RL has substantially out-of-plane or perpendicular magnetic anisotropy as a result of the c-axis of its hcp crystalline structure being induced to grow substantially perpendicular to the plane of the layer during deposition. To induce this growth of the hcp RL, the IL onto which the RL is formed is also an hcp material. Ruthenium (Ru) and certain Ru alloys, such as RuCr, are nonmagnetic hcp materials that are used for the IL.

The enhancement of segregation of the magnetic grains in the RL by the additive oxides is important for achieving high areal density and recording performance. The intergranular material not only effectively decouples intergranular exchange but also exerts control on the size and distribution of the magnetic grains in the RL. Current disk fabrication methods achieve this segregated RL by growing the RL on an IL that exhibits columnar growth of its grains. The columnar growth of the IL is accomplished by sputter depositing it at a relatively high sputtering pressure. However, growth of the RL on this type of IL leads to significant roughness and discontinuities in the RL, and consequently to reduced mechanical integrity of the protective OC. Poor OC coverage, roughness in the RL, and columnar growth of the IL provide a relatively easy path for water and corrosive agents to migrate through these layers and interact with the SUL. Formation of the IL at reduced sputtering pressure can reduce the RL roughness and improve the corrosion resistance of the disk. However, disks with ILs formed at lower sputtering pressure exhibit significantly reduced coercivity and thus poor recording performance.

What is needed is a perpendicular magnetic recording disk that has a granular cobalt alloy RL with additive oxides and that exhibits good corrosion resistance without compromising recording performance.

US patent application US20050153169A1 discloses in FIG. 1a a dual magnetic recording layer perpendicular media. The media is described in paragraphs 20 and 21. Paragraph 20 describes the top layer of the recording layer to possibly be comprised of an oxide. However, paragraph 21, which describes the bottom layer of the recording layer does not describe this layer as an oxide.

US patent application US20040185308A1 discloses in FIG. 1a a dual magnetic recording layer perpendicular media. The application describes two oxide layers used as the recording dual layer. However, the application does not describe the use of Ta in the recording layer. Further, the application describes an O content higher in the top layer of the recording layer than the bottom layer.

Two other references describe various recording media. US patent application 20020136929A1 describes a multi-layer structure for a magnetic recording layer. However, the application describes a recording layer and media structure for a longitudinal recording system. U.S. Pat. No. 5,516,547 describes a media with a single oxide recording layer. However, the media described in the reference does not include a dual layer recording layer.

What is needed is a dual layer magnetic recording layer for perpendicular recording. The recording layer includes the advantages of the properties of Ta alloy Oxides. Further, the recording layer benefits from judicious selection of O levels in each of the two layers of the magnetic recording layer. These elements provide improvement in magnetic recording performance when compared to prior art PMR media employing another magnetic recording layer.

SUMMARY OF THE INVENTION

Described herein is a media for perpendicular magnetic recording. The media includes in order a substrate, an adhesion layer, a soft under layer (SUL), an exchange break layer (EBL), a magnetic recording layer and an overcoat. Specifically, the magnetic recording layer includes two magnetic oxide layers. The dual layer magnetic recording layer includes an O content which is higher in the bottom layer than in the top layer. The bottom magnetic layer of the magnetic recording layer also includes Ta.

A dual layer magnetic recording layer where the bottom layer includes Ta provides several additional advantages. These advantages include a thinner EBL and better corrosion resistance.

In addition the bottom magnetic layer of the magnetic recording layer may be a non-oxide. This layer could be Co or CoCr. Also, the bottom magnetic layer of the magnetic recording layer can be CoCrOXY where X=Pt, Pd, Fe or Ni and Y=Ta, Nb, Hf or Si.

The media for perpendicular recording can be combined with an appropriate magnetic head and other components to form a perpendicular magnetic recording disk drive.

BRIEF DESCRIPTION OF THE DRAWINGS

The present invention will be better understood when consideration is given to the following detailed description thereof. Such description makes reference to the drawings, wherein.

DETAILED DESCRIPTION OF THE INVENTION

For purposes of this disclosure, the following terms are defined as follows:

"Above" means above, but not necessarily in contact with; and

"Alloy" means a composition of matter with two or more elements, wherein at least one of the elements is a metal. An alloy of a composition of matter can include itself (e.g. an FeCo alloy includes FeCo).

Figure 3:
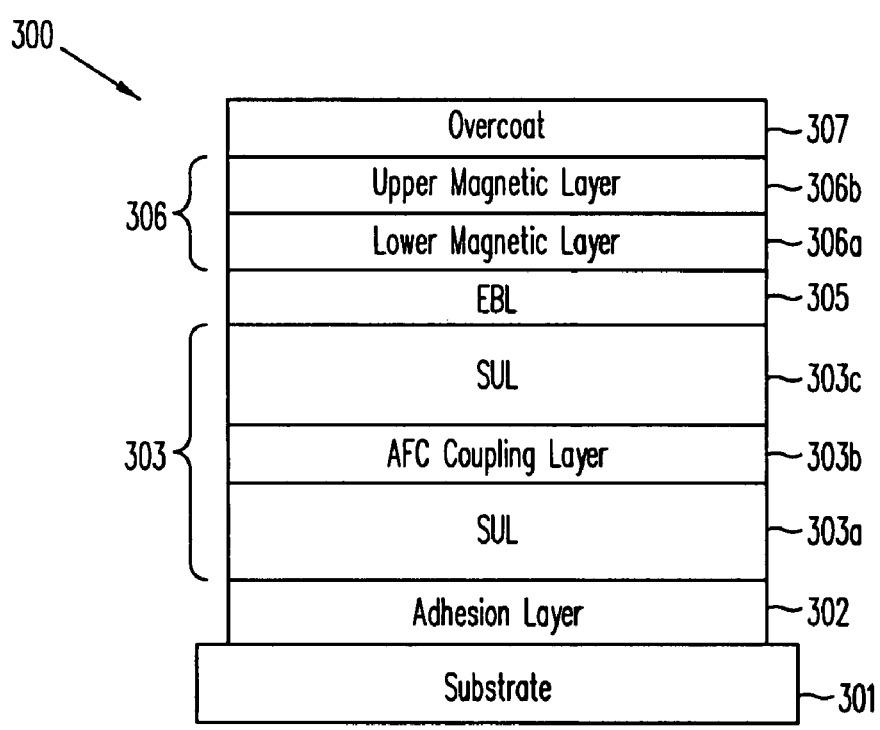
FIG. 3 is a media with a magnetic recording layer including a dual oxide layer.

A media 300 for a perpendicular recording system is generally described in FIG. 3. The perpendicular media described can be used for instance as a disk in a disk drive or as tape in a tape drive. The media includes a substrate 301 of glass, AlMg or any other substrate used as a substrate for magnetic media such as ceramics or glass/ceramic mixtures. Above the substrate is an adhesion layer 302. Above the adhesion layer 302 is a soft under layer (SUL) 303. Above the SUL 303 is an exchange break layer 305. Above the exchange break layer 305 is a magnetic recording layer 306. Above the magnetic recording layer 306 is an overcoat 307. The layers above the substrate may be sputter deposited or platted onto the media. Below are described particular implementations of the perpendicular media 300.

The adhesion layer 302 is made of AlTi. The adhesion layer 102 is typically between 2 nm and 20 nm thick.

The SUL 303 is made of an alloy of CoTaZr. The SUL 303 is typically between 20 nm and 100 nm thick. In addition the SUL 303 may be an antiferomagnetically coupled (AFC) structure including a first SUL 303a and a second SUL 303c coupled by an AFC coupling layer 303b. In this configuration the two SUL layers 303a and 303c are between 10 nm and 50 nm. Further, the AFC coupling layer may be made of Ru or RuCo and be between 6 angstroms and 10 angstroms thick.

Exchange break layer (EBL) 305 is designed to separate the magnetic recording layer from the SUL and to control the growth orientation of the magnetic recording layer. The EBL is made of Ru but can also be formed of RuTi and Ti. The EBL can be between 9 nm and 40 nm. Further a layer 5 nm to 30 nm of Ni or NiX may optionally be inserted below the EBL and above the SUL.

Magnetic recording layer 306 is where data is stored on the media. In one embodiment, the perpendicular magnetic recording layer is a dual oxide layer. The top oxide layer 106b of the magnetic recording layer is an alloy of CoPtCrSiO. The bottom oxide layer 106a of the magnetic recording layer is an alloy of CoPtCrTaO. The total thickness of the dual oxide layers is around 8-25 nm. The bottom TaO layer can be thinner than top SiO layer to increase the corrosion resistivity of the disk. Therefore, the top SiO layer thickness is around 5-20 nm, and bottom TaO thickness is around 1-13 nm. More preferably, the top magnetic layer is 6-10 nm and the bottom magnetic layer is 3-7 nm. In an alternative embodiment, the bottom oxide layer is an alloy of CoPtCrNbO.

The preferred composition for CoPtCrSiO is Co 65 at. %, Pt 18 at. %, Cr 17 at. %, in the CoPtCr alloy. Further, the SiO is most preferred at 8 mol % with CoPtCr at 92 mol %. The preferred range for Pt and Cr from the preferred composition is ±2 at. % and for Co is ±4 at. %. The preferred deviation from the preferred SiO composition is ±6 mol % and more preferred at ±2 mol %.

For both CoPtCr—TaO and —NbO, the preferred composition is Co 65 at. %, Pt 16 at. %, Cr 19 at. %, in CoPtCr alloy, while the TaO or NbO is 3.75 mol % and the CoPtCr alloy is 96.25 mol %. The preferred range for Pt and Cr from the preferred composition is ±2 at. % and for Co is ±4 at. %. The preferred deviation from the preferred TaO or NbO range is ±2.25 mol % and more preferably ±1 mol %.

In a second alternative embodiment, the bottom magnetic layer 306a may be a non-oxide, specifically Co or CoCr. An example of such a bottom layer is $CoCr_{14}$. The Cr can range from 0 to 25 at. % in the CoCr alloy of layer 306a and preferably, the at. % or Cr is less than 20. Further, the Co or CoCr layer 306a may be sputtered in an $Ar/N_2$ gas mixture in order to dope $N_2$ in the layer. The non-oxide can help to inhibit corrosion of the disk. This layer may be from 2 to 10 nm and preferably from 3 to 6 nm.

In a third alternative embodiment, the lower magnetic layer 306a is a weakly magnetic layer comprising CoCrOXY where X=Pt, Pd, Fe or Ni and Y=Ta, Nb, Hf or Si. The Co is between 35 at. % and 70 at. % and preferably 50 at. % to 60 at. %. The Cr is between 15 at. % and 30 at. % and preferably 20 at. % to 25 at. %. The YO is between 5 at. % and 20 at. % and preferably 8 at. % to 12 at. %. The X is between 2 at. % and 25 at. % and preferably 10 at. % to 15 at. %. The weakly magnetic layer helps to limit the amount of exchange between the grains in the magnetic layer. This layer may be from 0.5 to 10 nm and preferably from 1 to 7 nm.

Figure 1:
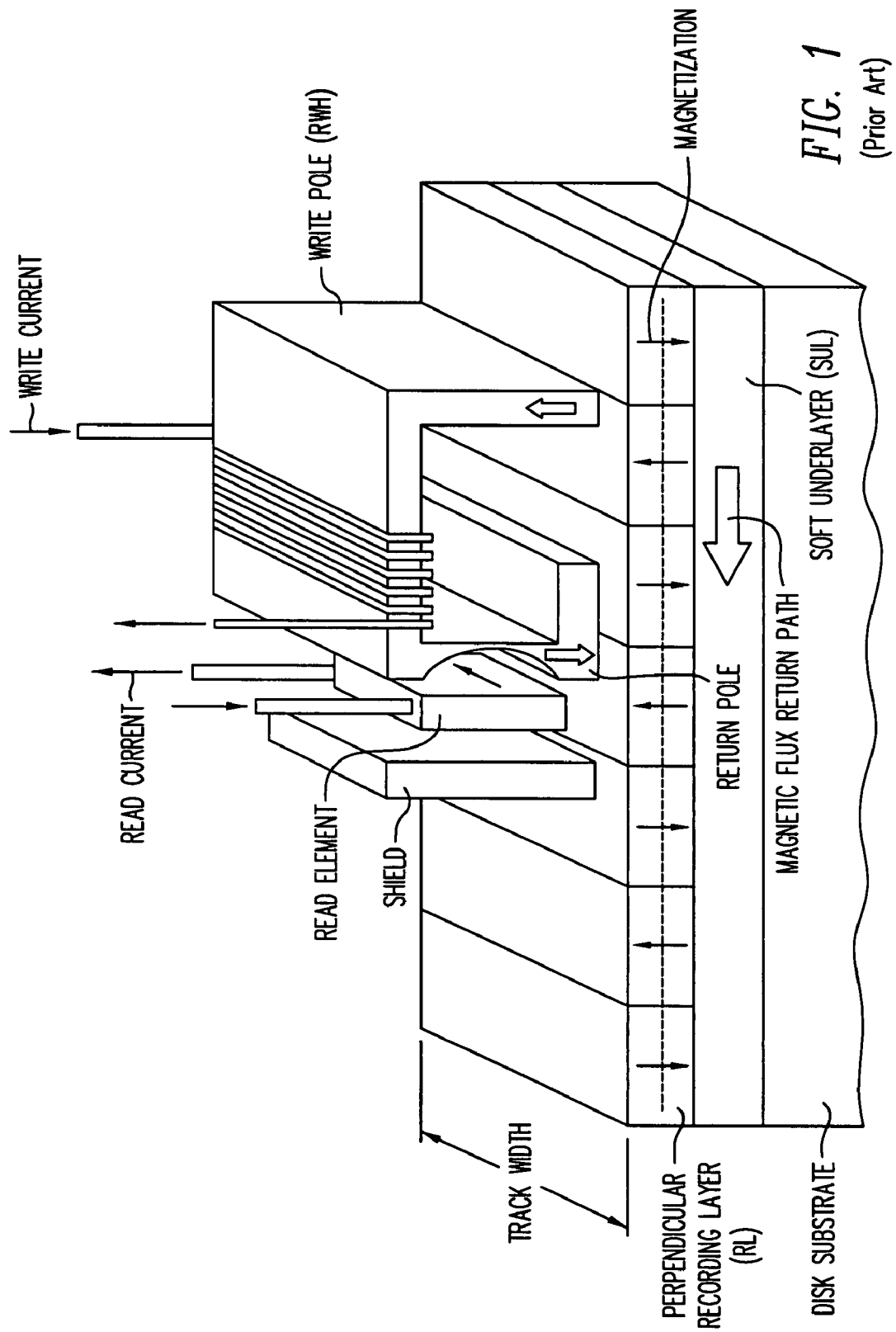
FIG. 1 is a perpendicular magnetic recording system that uses a dual-layer media.
Figure 2:
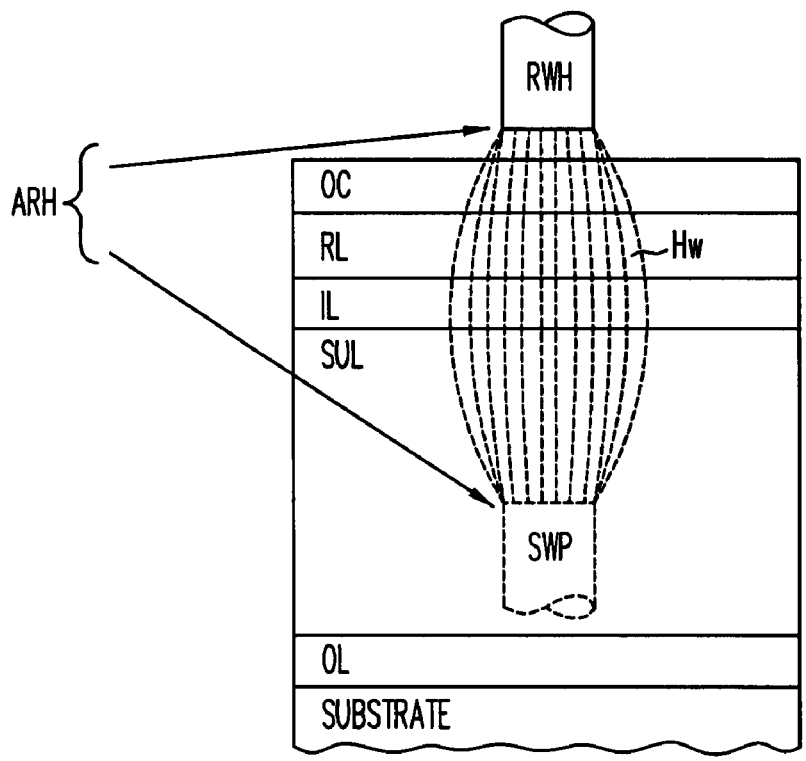
FIG. 2 is a schematic of a cross-section of a prior art perpendicular magnetic recording disk showing the write field $H_w$ acting on the recording layer RL.
Figure 4:
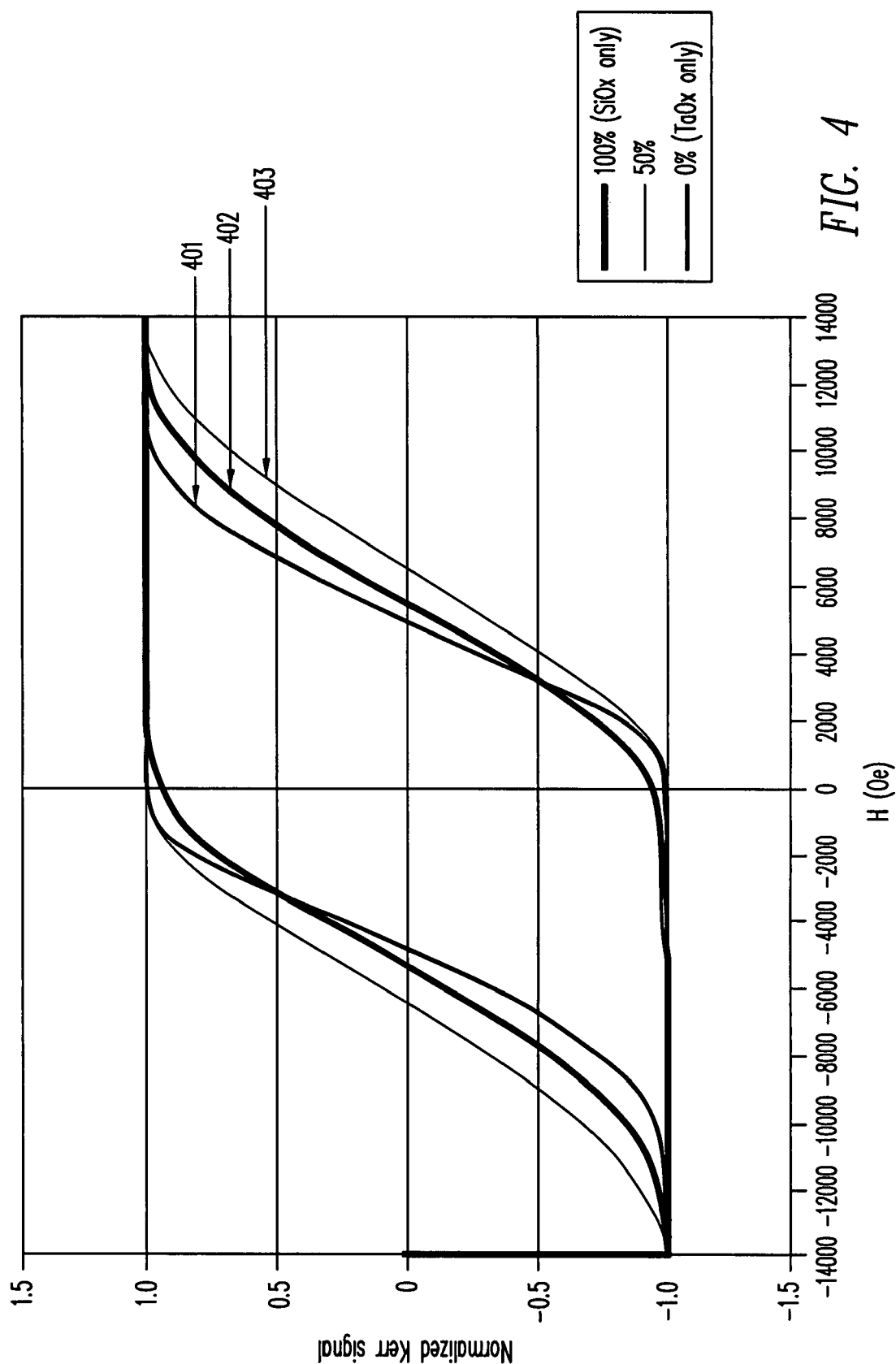
FIG. 4 is a graph of Kerr hysteresis loops for various media.

FIG. 4 is a graph of Kerr hysteresis loops for three types of media. Loop 401 is a hysteresis loop for a media as described in FIG. 3 except wherein the magnetic recording later is made of a single layer of TaO. Loop 402 is a hysteresis loop for a media as described in FIG. 1 except wherein the magnetic recording later is made of a single layer of SiO. Loop 403 is a hysteresis loop for a media as described in FIG. 1, wherein the thicknesses of the upper SiOx layer 306b and the lower TaO layer 306a are equal. As can be seen from the hysteresis loops, the coercivity of the media is maximized with a recording layer which includes the CoPtCrSiO/CoPtCrTaO bi-layer. Further, loop 402 shows a gentler slope which indicates more grain separation. The negligible nucleation field indicates the media includes small and unstable grains. Loop 401 being more square with sharper transitions demonstrates larger inter-granular-exchange coupling of media with a Ta-oxide recording layer. However, neither of these conditions is optimal for recording. By combining the two layers in a bi-layer several advantages occur such as an increase in coercivity, increase in nucleation field, and increase in thermal stability. It appears that the small isolated grains in the upper layer 306b are stabilized by the larger exchange coupling of the lower layer.

Figure 5:
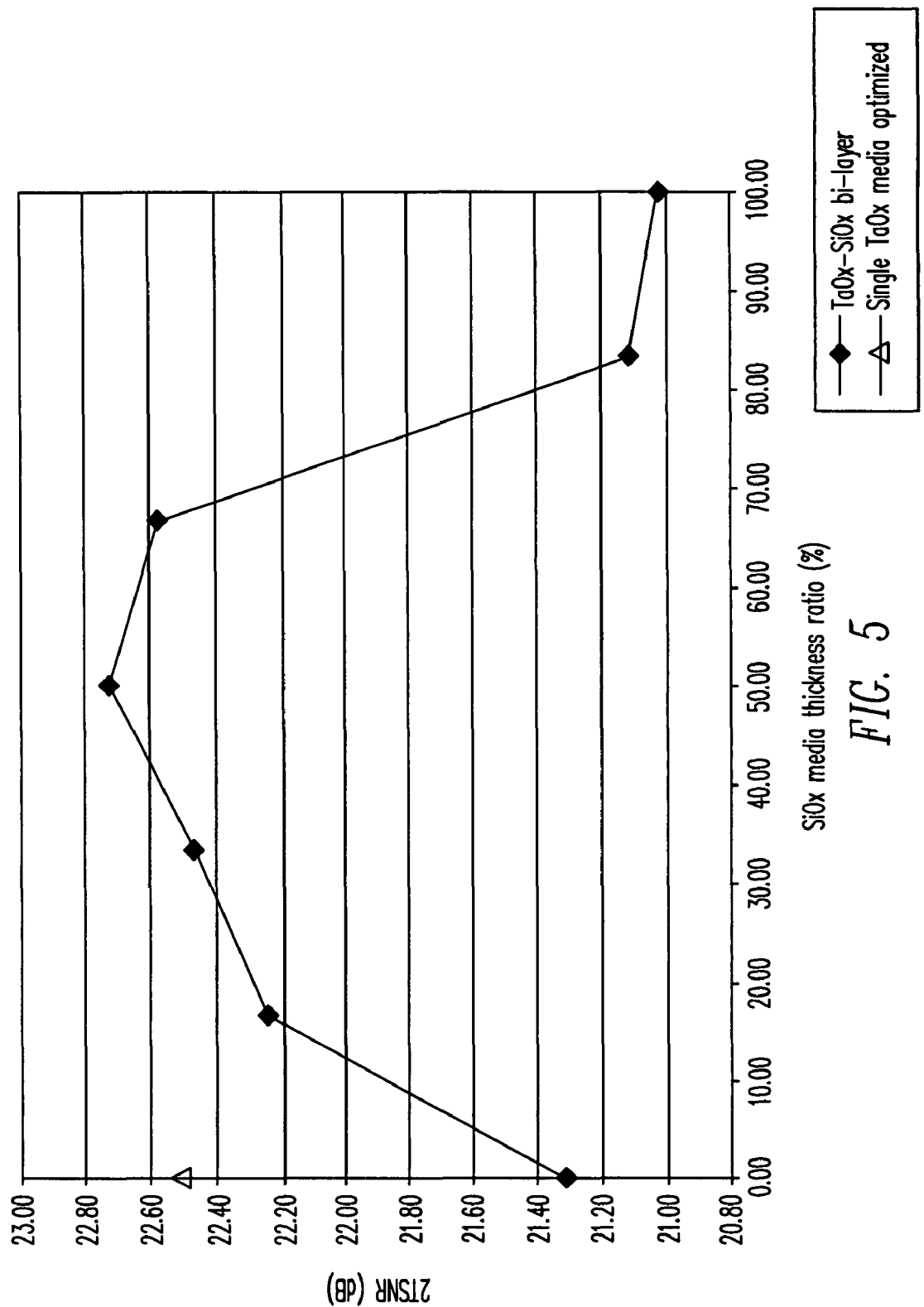
FIG. 5 is a graph of SNR for media based on the thicknesses of the oxide layers in the magnetic recording layer.

FIG. 5 shows a graph of the recording layer of the media 300 against SNR. The x-axis is the CoPtCrSiO thickness ratio (%) of the media. Thus, the left end of the graph is a single CoPtCrTaO recording layer 306 while the right end of the graph is a single CoPtCrSiO recording layer 306. As can be seen from the graph, the SNR is optimal when the bi-layer is approximately CoPtCrSiO and CoPtCrTaO.

Figure 6:
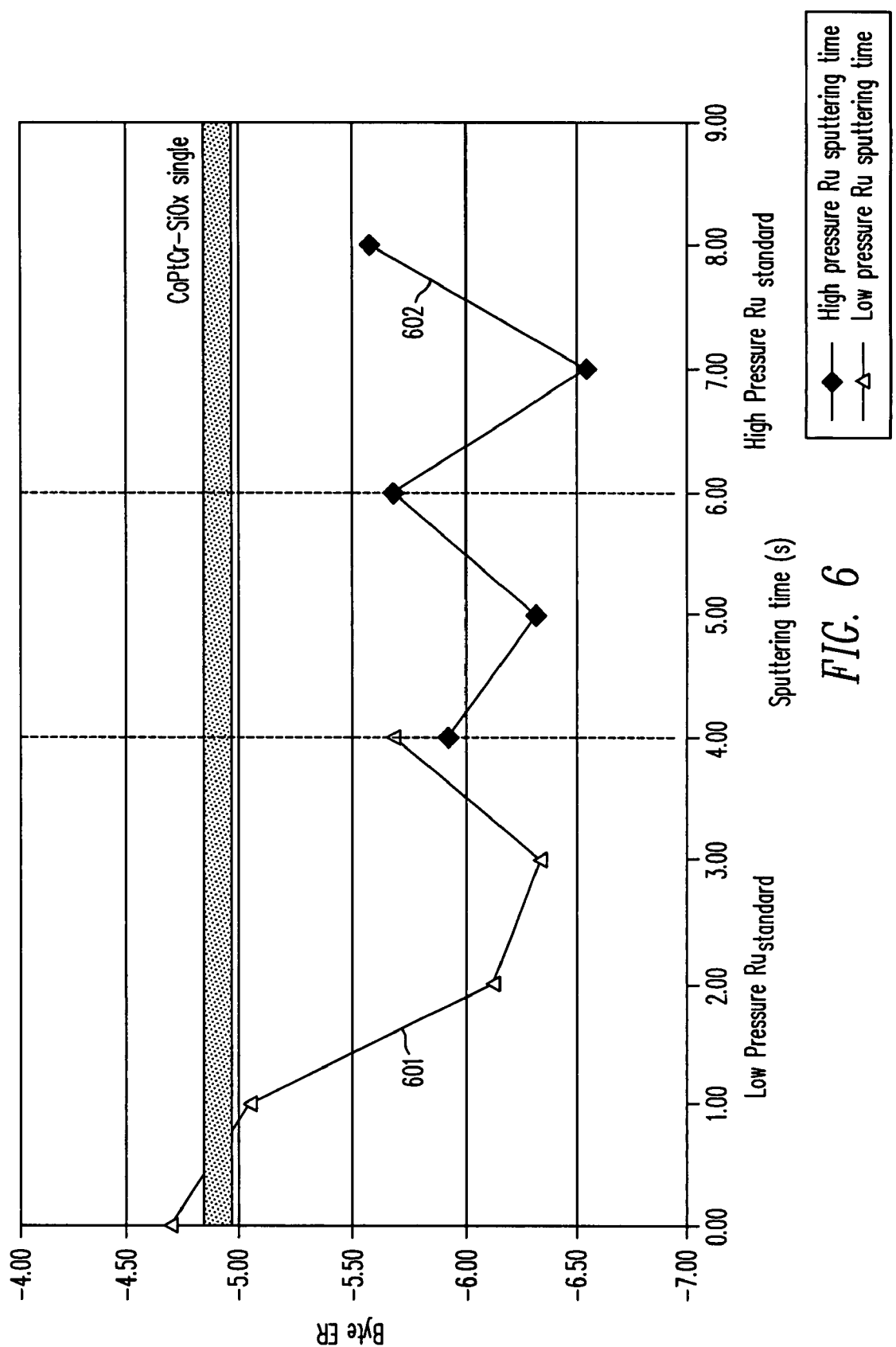
FIG. 6 is a graph of Byte Error Rate dependence on the thickness of the EBL and the pressure in which the EBL is sputtered.

FIG. 6 is a graph of Byte Error Rate (BER) dependence on the thickness of the EBL 305 and the pressure in which the EBL 305 is sputtered. The EBL 305 is compromised of two Ru layers deposited at different conditions—a lower layer deposited at lower pressure and upper layer deposited at higher pressure. The curve 602 shows changes to the upper Ru thickness while keeping lower Ru thickness constant. The curve 601 show changes to the lower Ru thickness while keeping upper Ru thickness constant. The vertical lines indicate the standard thickness of each Ru layer for optimized single CoPtCrTaO media. The BER remains good even after reducing the Ru thickness from the standard thickness. In this b-layer case, since the recording layer is more exchange coupled layer than a single layer CoPtCrTaO media, a thinner Ru underlayer which provide less grain segregation than thick Ru layer without degrading the performance can be used. Thinner EBLs yield sharp write field gradient, and result in higher recording density by higher resolution, higher writability, and higher amplitude.

Tests, such as electro-chemical corrosion current, Co-extraction and condensation, show the corrosion resistivity is also improved by the EBL 305 and dual magnetic layer 306. The tests show single CoPtCrTaO media has much higher corrosion potential than the single CoPtCrSiO media. Different methods applied to reduce the corrosion potential of the single layer CoPtCrTaO media without hurting recording performance has been unsuccessful. The CoPtCrTaO bottom layer and CoPtCSiO top layer combine recording advantages of having a CoPtCrTaO bottom layer and superior corrosion performance of the CoPtCSiO media.

Figure 7:
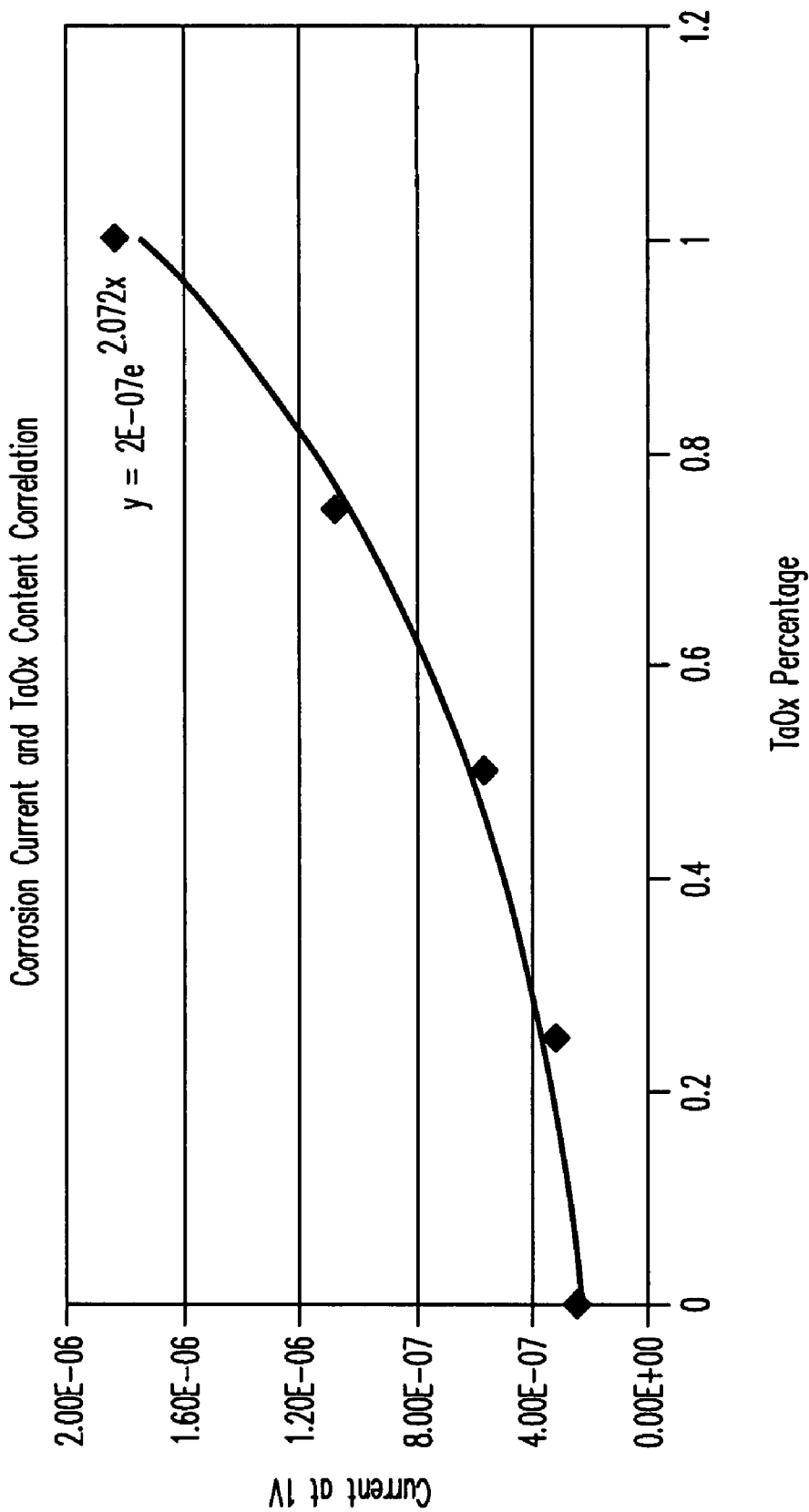
FIG. 7 is a graph of corrosion current dependence of the media based on the CoPtCrTaO layer thickness ration in a CoPtCrSiO/CoPtCrTaO dual layer.

FIG. 7 is corrosion current dependence of CoPtCrTaO thickness as a percentage of total CoPtCrSiO/CoPtCrTaO in a bi-layer media. The figure shows that the smaller the current, the better the corrosion resistivity. The corrosion current of single layer CoPtCrTaO (100%) media is one order of magnitude higher than single layer CoPtCrSiO media (0%). Therefore, the corrosion current is significantly reduced as the thickness ratio of CoPtCrTaO layer decreased. As the current dependence of the thickness ratio is exponential, a thin CoPtCrSiO top layer can improve the corrosion resistivity. At a 50% bi-layer, the current is almost a third of a single layer CoPtCrTaO media. Therefore, the dual-layer recording layer 306 improves the corrosion resistivity significantly.

Overcoat 307 is made of a diamond like carbon (DLC). It protects the magnetic recording layer from scratching and corrosion. Typically, overcoat 307 is between 1 nm and 5 nm. Of course, the thinner the overcoat, the closer a magnetic head will fly over the media. Generally, less distance between the head and media improves the recording and reading characteristics of a recording system.

The present invention is not limited by the previous embodiments or examples heretofore described. Rather, the scope of the present invention is to be defined by these descriptions taken together with the attached claims and their equivalents.

What is claimed is:

1. A perpendicular recording media comprising:
a substrate; and
a magnetic recording layer, above the substrate, including a first layer above a second layer, wherein
the first layer has a higher mol percentage of an oxide than the second layer;
the first layer is in contact with the second layer; and
the first layer comprises a material including an oxide consisting of silicon oxide and the second layer comprises a material including an oxide consisting of tantalum oxide.

2. The perpendicular recording media of claim 1, wherein the material in the first layer comprises CoCrPt and an oxide consisting of silicon oxide and the material in the second layer comprises CoCrPt and an oxide consisting of tantalum oxide.

3. The perpendicular recoding media of claim 2, wherein the second layer includes a composition of Co between 61 and 69 at. %, Cr between 17 and 21 at. %, Pt between 14 and 18 at. % and
a mol concentration of $(CoPtCr)_{100-x}$(tantalum oxide)$_x$ where x is between 0.5 and 7 mol %.

4. The perpendicular recording media of claim 1, wherein the thickness of the first layer is about equal to the thickness of the second layer.

5. The perpendicular recording media of claim 1, wherein the thickness of the first layer is about between about half and about twice the thickness of the second layer.

6. The perpendicular recording media of claim 5, further including an exchange break layer (EBL) above the substrate and below the magnetic recording layer, wherein the thickness of the EBL is less than 12 nm.

7. The perpendicular recording media of claim 1, wherein the thickness of the first layer is about between about one tenth and about ten times the thickness of the second layer.

8. The perpendicular recording media of claim 1, further including an exchange break layer (EBL) above the substrate and below the magnetic recording layer.

9. The perpendicular recording media of claim 8, wherein the thickness of the EBL is less than 12 nm.

10. The perpendicular recording media of claim 9, wherein a layer of a Ni alloy between 10 and 30 nm is inserted below the EBL and above the substrate.

11. The perpendicular recording media of claim 10, including a soft under layer (SUL) inserted between the substrate and the Ni alloy.

12. The perpendicular recording media of claim 11, wherein the SUL is antiferromagnetically coupled.

* * * * *